United States Patent [19]
MacMillan

[11] 3,956,830
[45] May 18, 1976

[54] WHEEL ALIGNMENT INSTRUMENT AND MEASUREMENT METHOD

[76] Inventor: Charles W. MacMillan, 3400 20th St. Ct., Rock Island, Ill. 61201

[22] Filed: Aug. 13, 1974

[21] Appl. No.: 497,070

[52] U.S. Cl............................. 33/337; 33/203.18
[51] Int. Cl.²................................... G01B 13/195
[58] Field of Search............... 33/336, 335, 203.18, 33/203, 203.12

[56] References Cited
UNITED STATES PATENTS

| | | | |
|---|---|---|---|
| 2,474,616 | 6/1949 | Castiglia | 33/203.21 |
| 3,188,747 | 6/1965 | Race | 33/203.12 X |
| 3,423,839 | 1/1969 | Liskey | 33/336 |

*Primary Examiner*—William D. Martin, Jr.

[57] ABSTRACT

An instrument for measurement of the principal alignment angles of vehicle wheels, namely, camber, caster, steering axis inclination, and toe, and method pertaining to the latter; the instrument and attachments embodying novel features designed for simplicity of operation, high accuracy, improved resolution of readings, durability, and economy.

11 Claims, 32 Drawing Figures

$$\theta = \sin^{-1} \frac{H}{R}$$

WHEEL ALIGNMENT INSTRUMENT AND MEASUREMENT METHOD

BACKGROUND OF INVENTION

The art in the field of wheel alignment devices and instruments extends back for many years encompassing a variety of designs. In recent years, gages which attach directly to the machined face of wheel hubs, principally by means of a permanent magnet have been in popular use. While these gages have been useful, the majority have been of a common design which makes use of long, tubular level vials having adjacent graduations for indicating a reading opposite the position of the vial bubble. Resolution of readings in this type of vial is limited to the operator's ability to judge the position of the adjacent scale mark relative to the center of the bubble which is normally about five-sixteenths of an inch long. In addition, the long vials are not uniformly accurate in curvature even when internally ground. A further disadvantage of these long tubular vials is their large exposure of glass, making them vulnerable to breakage. Examples of this type of gage in which long vials are used are : U.S. Pat. No. 3,071, 863 and No. 3,234,656 (MacMillan), also No. 2,645,860, expired (Bender).

An example of a wheel alignment gage in which a single short vial is used is found in expired U.S. Pat. No. Re. 24,186 (Castiglia).

A single, short vial is incorporated in the present disclosure in which new and novel features are presented.

The wheel toe measuring feature of the present disclosure provides advantages over that of U.S. Pat. No. 3,135,052 (MacMillan) which incorporates toe measurement means dependent on square and accurate construction of the apparatus. In contrast, the present invention provides high accuracy of toe measurement as a result of discovery of a greatly simplified arcuate method of establishing toe measuring base lines.

SUMMARY OF THE INVENTION

An object of the present invention is to advance the art thru incorporation of new and novel improvements in a new instrument for determining wheel alignment measurements.

Another object is to provide a wheel alignment instrument with graduated scales of substantially increased length over those heretofore in use while retaining overall compactness.

Another object is the provision of a single, short vial which is surrounded by a circular, horizontal dial on which degree graduations for camber, caster, and steering axis inclination appear around the periphery thereof and two independent pointers associated therewith.

Another object is the provision of a wheel alignment diagnostic instrument for making all the important measurements required in vehicle service including that of toe-in and toe-out of a pair of wheels.

Another object is to provide an instrument which does not depend on the operator's ability to judge the location of a graduation line relative to the center of a bubble in a leveled vial.

Still another object is the provision of a novel and compact vial tilt actuating means which automatically and simultaneously positions the instrument dial scale opposite a stationary pointer to provide a reading when the bubble of the vial is centered between two lines on the glass of the vial.

Other objects and improvements over the prior art will become evident from the detailed description.

This invention comprises an instrument which may be fastened to a vehicle wheel for measuring any of the conventional alignment angles as well as the toe of a pair of wheels. When measuring toe either a second instrument or a substitute body is used on one of a pair of wheels.

The construction of the invention disclosed provides features heretofore lacking in instruments of this class such as a circular, horizontal dial containing "expanded" graduations and associated pointers to produce sharp and definite readings of small fractions of degrees. The dial contains, in a continuous circle, all the graduations required for measurement and correction except those for wheel toe which are separately provided. A compact assembled mechanism within a circular body which supports the dial permits leveling of the vial by merely rotating the dial. When the bubble is thus centered in the vial, a reading of either caster or camber or steering axis inclination is obtained, as the case may be.

A support body, which is a part of the instrument, houses a strong permanent magnet by means of which the instrument is held on, and square with, the vehicle wheel.

Wheel toe measuring means are provided in which true, but imaginary, lines are established on a horizontal plane in exact parallelism to each of a pair of wheels by rotation of the instruments thru an arc as they adhere to the wheel hub face. The toe-in or toe-out of the wheels is determined by measuring the difference in distances between the aft and forward ends of the imaginary lines. The instrument consists of a gage body assembly, a pair of detachable rods, a pair of "toe-line" end blocks one of which contains toe graduations, and a toe measuring rod.

The single, short level vial incorporated in the disclosed instrument may be made practically indistructable by provision of a transparent plastic, domeshaped cover fitting the central circular opening in the dial.

Additional original and advantageous features will become apparent from the drawings and description.

DESCRIPTION OF THE DRAWINGS

FIG. 19 is a bottom projection of FIG. 18.

FIG. 20 is a view of a control arm carrying a camber (and caster correction) pointer.

FIG. 21 is a view of a second arm carrying a caster (and steering-axis-inclination) pointer.

DETAILED DESCRIPTION

Figures 1, 2:
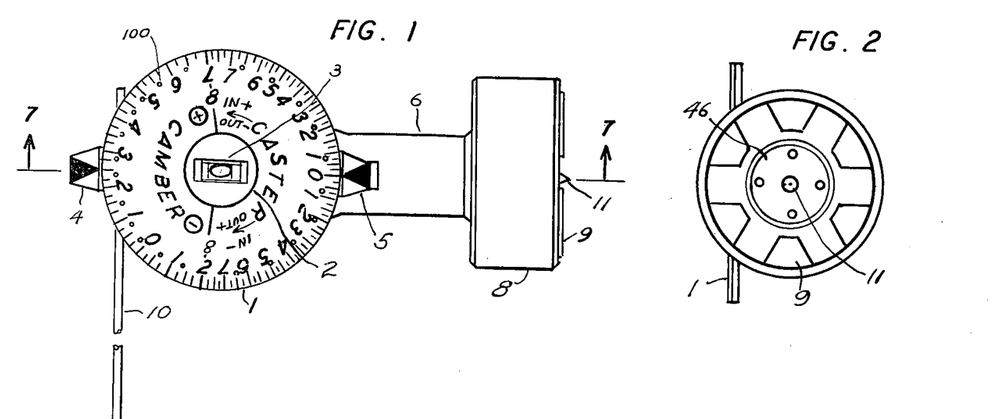
FIG. 1 is a plan view of the instrument.
FIG. 2 is an end view of FIG. 1.
Figure 3:
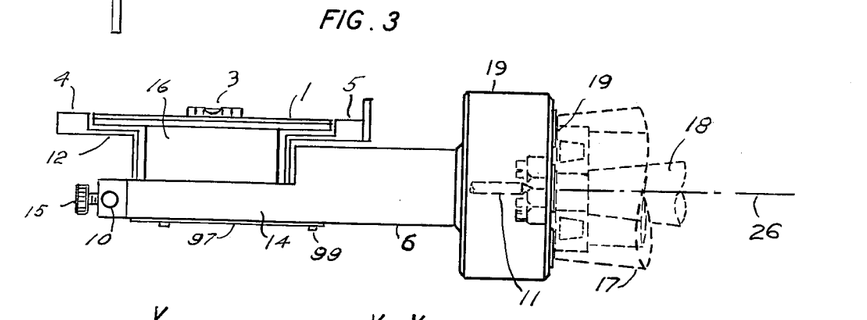
FIG. 3 is a side elevation of FIG. 1, and a hub.

A general appearance of the wheel alignment instrument is depicted in FIGS. 1, 2 and 3 wherein circular dial 1 contains graduations for camber and caster angles. Pointers 4 and 5 are associated respectively with the camber and caster scales and are contained on the outer ends of arms 12 and 13 respectively. Cup shaped body 16 is rotatably mounted in support body 14 which is provided with a threaded thumb screw 15 at the outer extremity, and rod 10 secured thereby in an appropriate free fitting hole. The instrument is mounted, in use, on a vehicle wheel as indicated in FIG. 3 in which dash lines represent a wheel hub 17 and associated wheel spindle 18. The squarely finished pole faces of magnet 9 interface with and adhere to annular, machined hub surface 19. A pointed end of centering pointer 11 enters the countersunk end of spindle 18 to center the instrument with respect to the wheel axis 26. Thus the instrument is held squarely and centrally on the wheel.

A level vial 3 is movably mounted in the instrument so as to be easily visable in a central opening 2 of dial 1. As viewed in FIG. 3 an extension 6 of support body 14 terminates in housing 8 which contains permanent magnet 9 and centering pointer 11 both of which are retained in housing 8 by a threaded piece 46.

Figure 4:
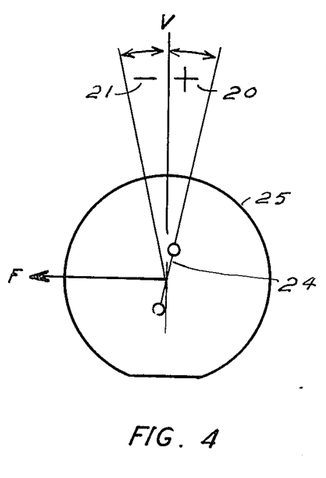
FIG. 4 is a wheel diagram illustrating the conventional angle of caster.
Figures 5, 6:
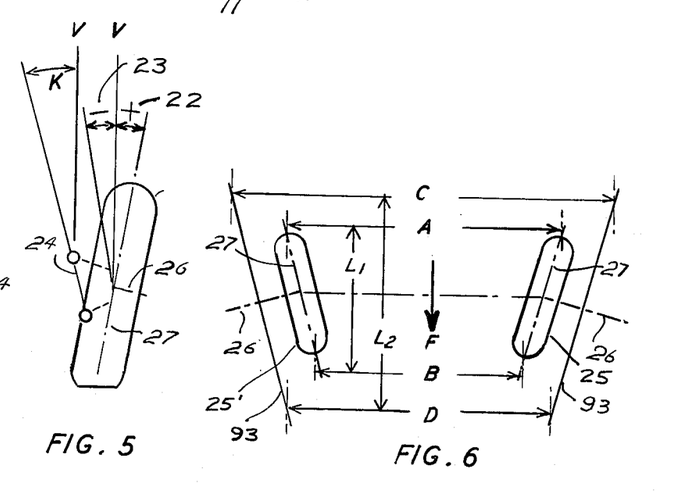
FIG. 5 is a wheel diagram illustrating the conventional angles of steering-axis-inclination (or king-pin angle) and camber.
FIG. 6 is a plan view diagram of a pair of wheels illustrating the geometry of measuring "toe".

Conventional wheel alignment angles are reviewed in FIGS. 4, 5, and 6 wherein F designates the forward direction of the vehicle, and V represents vertical reference lines. Angles 20 and 21 illustrate positive (plus) and negative (minus) caster of the steering axis 24 of wheel 25. Angles 22 and 23 illustrate positive and negative camber respectively of the wheel center line 27. Angle K illustrates the inward inclination of steering axis 24. Wheel axis 26 is perpendicular to wheel centerline 27 and thus may coveniently be used to determine all of the alignment angles of concern.

In FIG. 6 a plan view of a pair of wheels illustrates the conventional "toe" measurement and the corresponding magnified equivalent obtained by use of the present invention. In practice toe has been measured in linear terms such as inches or millimeters rather than in angular terms. Thus a graduated scale for the average passenger car tire diameter, and another for the average truck tire diameter provides simplicity for service personnel as well as adequate accuracy. Nevertheless, provision for an accurate zero point in the measurement of toe is mandatory, since all specifications are based on "in" or "out" from zero toe. Toe, in or out, is determined by measuring distances A and B (FIG. 6) and subtracting one from the other. The wheels are said to have "toe-in" if A is greater than B, while "toe-out" is the reverse. In the diagram imaginary straight lines 93 parallel to wheel planes 27 are established by a method to be described later herein. The difference between distances A and B is directly proportional to the difference between C and D, the proportionality factor being $L_2$ divided by $L_1$. Hence, the relation is:

$$C - D = L_2/L_1 (A - B).$$

Since $L_2$ is always greater than $L_1$ it is evident that the toe scale magnification is always greater than "one" and may be made as large as is practical.

Figure 7:
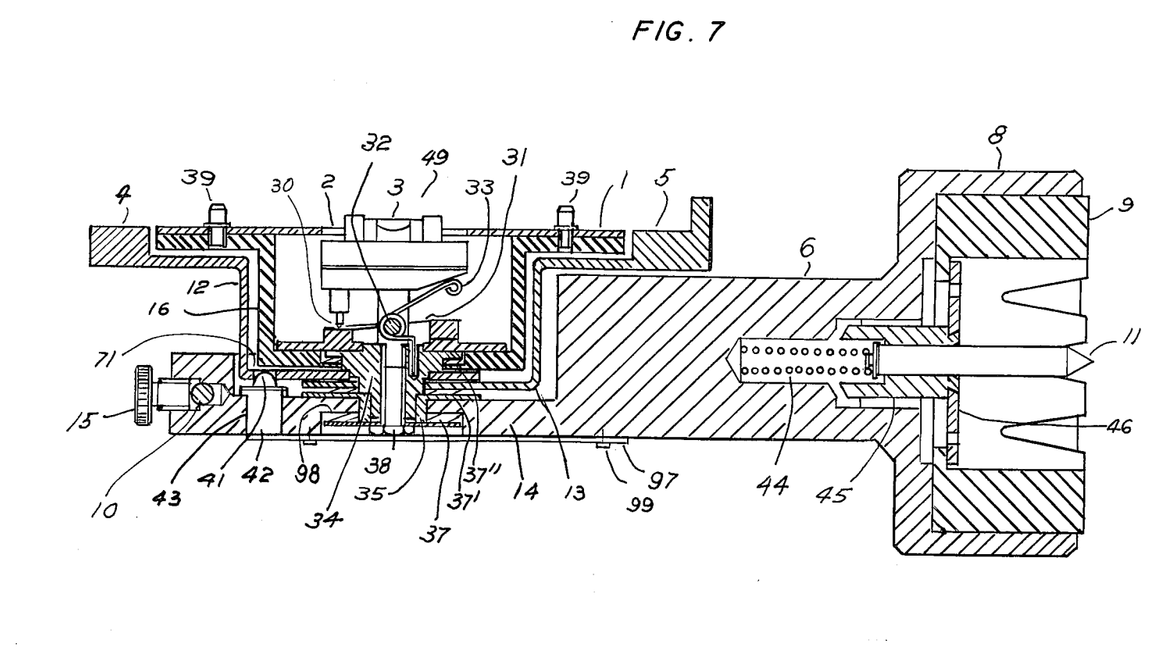
FIG. 7 is a vertical cross section of the instrument taken on line 7 — 7 of FIG. 1.
Figures 8, 9, 10, 11, 12, 13, 14, 15, 17, 18:
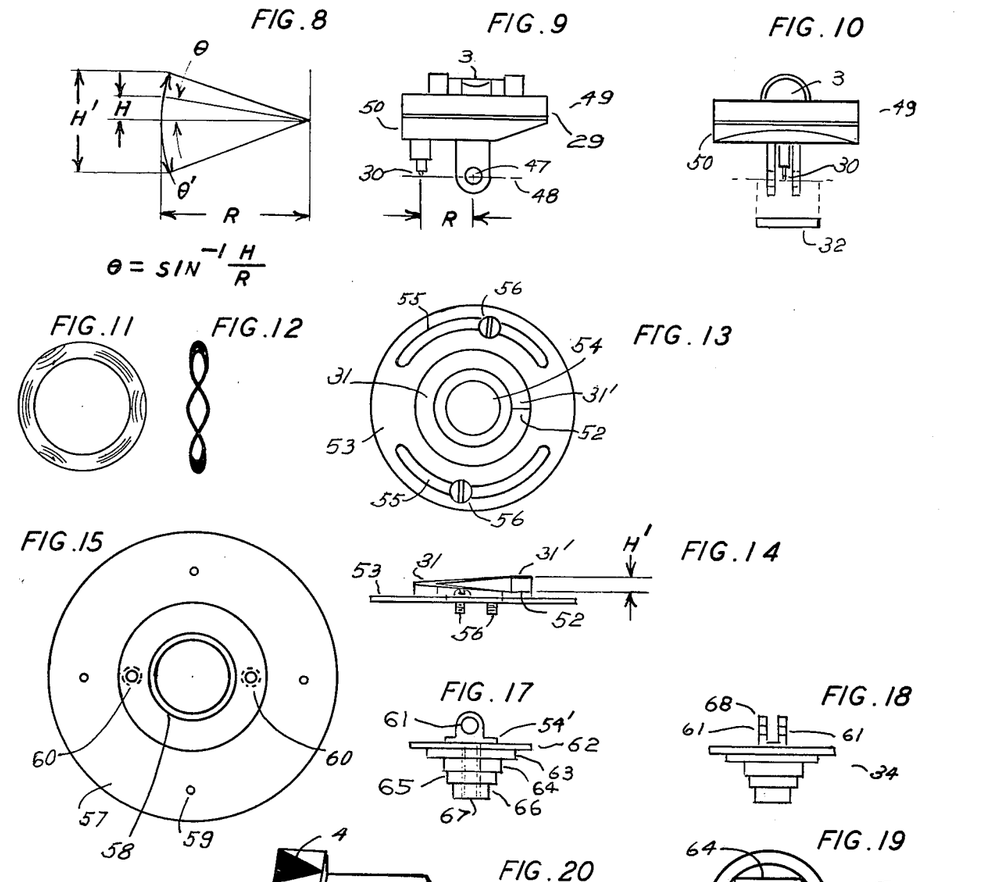
FIG. 8 is a trigonometric diagram illustrating a basis for the angle indicating system employed in the instrument.
FIG. 9 is an elevation of a cam and follower sub-assembly.
FIG. 10 is a right hand projection of FIG. 9.
FIG. 11 illustrates a a commercial wave spring washer optionally used in the instrument.
FIG. 12 is a right hand projection of FIG. 11.
FIG. 13 is a plan view of a special helix type of cam.
FIG. 14 is an elevation or side projection of FIG. 13.
FIG. 15 is plan view of a rotatable, cup-shaped, dial supporting body.
FIG. 17 is an elevation view of of a central support member.
FIG. 18 is a right hand projection of FIG. 17.
Figure 16:
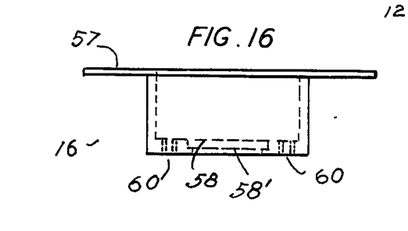
FIG. 16 is a side elevation of FIG. 15.

The mechanical relation between various components of the instrument is best illustrated by FIG. 7 and detailed FIGS. 9 thru 21. Cup-shaped part 16 is nested within arms 12 and 13 and is rotatably supported within base 14 by stepped, circular member 34. Arm 12 contains camber pointer 4 at one end, widened extension 69 at the other end, and square hole 70 together with small holes 71 and 72 as illustrated in FIG. 20. Arm 12 is held without looseness on square step 64 of piece 34 (FIGS. 17,18,19).

Arm 13 contains caster pointer 5 at one end and round hole 74 in widened flange 73 at the other end, (FIG. 21). Arm 13 is fitted for free turning on step journal 65 of piece 34 by means of hole 74. A wide flanged bushing 35 (FIG. 7) contains a central hole fitting step journal 66 of piece 34 and is fitted for free rotation in a matched hole in base 14. Flat washer 36 bears securely against the lower end of bushing 35 and is held in this position by screw 38 which threads into tapped hole 67 of piece 34. Screw 38 also holds all rotatable parts in their operable positions, and provides for fast, economical assembly in manufacture.

Cup-shaped part 16 (FIGS. 15 and 16) contains hole 58' in the bottom thereof, and is fitted for free turning on step journal 63 of piece 34. The largest step diameter 62 of piece 34 freely fits the counterbore 58 which is concentric whith hole 58'.

A cam surface 31 (FIGS. 13, 14) is formed as a 360° helix on a circular base 53 in which circular openings 55 and central opening 54 are provided. The lower end of the helix or cam surface is indicated at 52 and the upper end at 31'. The rise of the cam surface thru 360° is exactly equal to height H' as will be explained later. Small screws 56 extend freely thru circular openings 55 and thread into tapped holes 60 of cup 16. The upper small diameter 54' of piece 34 is fitted to turn freely in hole 54 of the cam of FIG. 13. When screws 56 are threaded into tapped holes 60 thru circular openings 55 while assembled to piece 34, these parts become operationally assembled to cup 16. If manufacturing tolerances are closely held between the step journal heights of piece 34 and the counterbore 58 depth, as well as thicknesses of arm flange ends 69 and 73, and the flange of bushing 35, free turning of parts without objectionable looseness may be obtained. However, for purposes of economical manufacture, and to assure controlled, permanently free operation of rotatable parts, use is made of steel spring wave washers (FIGS. 11,12) These commercially available washers are designed to take up the end play or looseness in certain shaft mounted parts. Other similar spring washers such as belville springs, or finter spring washers may also be effectively used. Their employment facilitates economical parts manufacture in the present invention by permitting greater dimensional tolerances while providing for ease of assembly and permanent operational smoothness. Wave spring washers are thus provided for at three places in the present assembly. They are depicted at 37, 37', and 37'' in FIG. 7. Specifically, and with reference to FIG. 17 they are located on the lower side of step 62, on the lower side of flange 73 (FIG. 21), and in the counterbore 98 of support base 14 (FIG. 7).

Level vial 3 is mounted in circular holder 29, FIG. 9, from the bottom thereof and is retained by mating circular piece 50 by means of screws not shown. Circular piece 50 has two lower protruding portions in which pivot hole 47 is provided. Also, held by and extending downward from piece 50 is a cam follower point 30. The latter may preferably be a small ball point such as used in widely marketed ball point pens. It should be noted that the contact point of the ball or cam follower coincides with a horizontal line thru the center of pivot hole 47 when the bubble of vial 3 is centered.

Pivot pin 32, FIG. 10, fits thru holes 61 of piece 34 and holes 47 of vial assembly 49 and simultaneously supports torsion spring 33 (FIG. 7) which maintains bias pressure of follower 30 against cam surface 31. When the bubble of vial 3 is centered and the finished pole faces of magnet 9 are in a vertical plane, the contact point of follower 30 is designed to rest at the mid-point of cam height H' and at a distance R from the center of the pivot holes 47. In this position the camber dial should indicate zero. Manufacturing allowances preclude the preestablishment of such coincidence with zero camber. Therefore circular slots 55 and screws 56 (FIG. 13) are provided to permit exact calibration at zero on the camber scale by turning the cam body of FIG. 13 relative to supporting cup 16 until the bubble of vial 3 is exactly centered while pointer 4 registers with zero camber. Screws 56 are then tightened thus maintaining the calibration.

A spring loaded "bullet" type latch 42, FIG. 7, having a rounded, spring loaded end 41 is pressed in a hole 43 in base 14. The rounded, bullet-shaped end 41 registers with and resiliently extends into either of holes 71 or 72 on the lower side of flange 69 of arm 12, FIGS. 7 and 20. In the normal position for measuring camber or caster, and for correcting camber, the bullet latch will be in hole 71. When steering axis inclination is to be measured or when caster is to be corrected the entire operating portion of the instrument is turned thru 90° in either direction, at which point the latch registers in one of holes 72 thus placing the vial assembly parallel with the wheel. This position is required for measuring steering axis inclination and for correcting caster.

Figure 22:
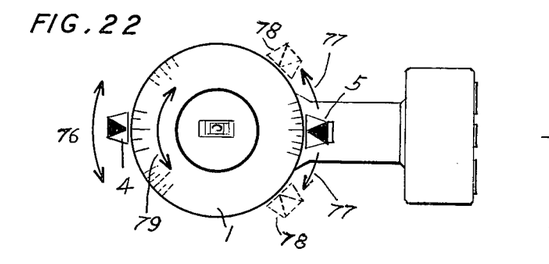
FIG. 22 is a plan view of the instrument illustrating the angular motion capability of the two pointer arms, the dial, and the entire dial and arms assembly.
Figure 23:
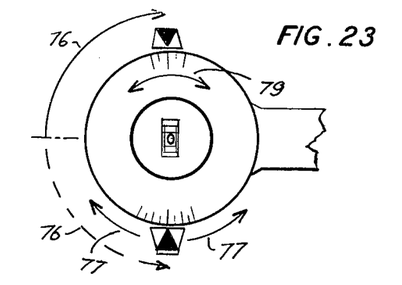
FIG. 23 is a partial plan view similar to that of FIG. 22 but illustrating the rotation of the entire pointer and dial assembly thru 90° in either direction.

Turning of the operating assembly of the instrument from a position in which the long axis of the vial 3 is perpendicular to the wheel to one in which it is parallel to the wheel is illustrated in FIGS. 22 and 23. Arrows 76 illustrate the directions of motion of pointer A which may be manually turned by pressing against either side of the end of arm 12 forcing catch 41 out of hole 71. At a 90° turn catch 41 snaps into one of holes 72, depending on the direction of turn, thus properly positioning the vial and associated parts in a position parallel with the wheel.

It is essential, and a unique feature of this invention, that the cup shaped piece 16 which carries dial 1 on its flange 57 is independently rotatable about its vertical axis without producing any rotatable effect on arms 12 and 13. Likewise any rotation of arms 12 or 13 has no *relative* effect on the position of each other or on part 16 and dial 1. The novel, independent, and free rotational movements of dial 1 and pointers 4 and 5 are illustrated by arrows 79, 76, and 77 respectively in FIGS. 22 and 23. Thus dial 1 may be turned about a vertical axis without movement of either pointer 4 or 5. Turning of dial 1 simultaneously turns cup piece 16 to which said dial is attached by small screws threading into four mounting holes 59 or by other means. Turning of dial 1 also simultaneously turns cam surface 31 since the latter is held rigid with 16 by calibration screws 56. The resulting rotation of cam surface 31 under follower point 30 causes the latter to rise or fall depending on which direction 31, and dial 1, are turned. This action tilts assembly 49 and vial 3 about pivot pin 32 in holes 47 and permits leveling the vial.

Dial 1 is accurately graduated in camber and caster units so as to cover the range of same in vehicle specifications currently existing throughout the world. These scales have been extended a few degrees beyond average specifications to accomodate unforeseen future specifications which may be greater, as well as to aid the operator in noting the extent to which some vehicle wheels may be out of alignment, as in the case of a vehicle involved in an accident.

Further extension of graduations is provided by small circles 100 (FIG. 1) which denote whole degrees each, and which extend from the camber zone into the caster zone of the dial, and visa versa. Thus maximum utilization of the 360° of dial space is achieved while providing for infrequent specifications which currently exist or which may be encountered in the future.

The graduations of dial 1 are so selected that the entire 360° of dial space exactly matches a whole, integral number of camber degrees and caster degrees. This has been accomplished in the instrument by establishing a maximum angle of tilt $\theta'$ (FIG. 8), of vial assembly 49, said angle being exactly equal to the desired number of caster degrees multiplied by a factor, plus the desired number of camber degrees. The caster multiplication factor referred to is 0.68249 which is an accurate relation between a camber degree and a caster degree as graduated on the instrument, caster being determined by swinging the wheel thru 40° (in one direction) and measuring the camber change produced thereby. One caster graduation equals 0.68249 times one camber graduation in terms of dial layout measurements. In this connection reference is made to Society of Automotive Engineers paper Number 20U presented January 1959, Annual Meeting, Detroit, Michigan (C. W. MacMillan).

The achievement of accurate and theoretically correct alignment indications in the instrument may best be explained by reference to FIGS. 8, 9, and 14 wherein H' represents the total rise of cam surface 31 corresponding to the total angle of tilt $\theta'$ of vial assembly 49. Any angle of tilt $\theta$ from a mid position is produced by a change H in the vertical position of follower point 30 on the cam surface due to rotation of the latter. In FIG. 8 it will be observed that SINE $\theta$ equals $H/R$, and $\theta = $ ARCSINE $(H/R)$. Having determined the desired values of H' and $\theta$ the distance R might be determined by solving the relation $R = H'/\text{SIN } \theta'$ : However it has been determined that the greatest accuracy over the entire range of $\theta'$, which in this design is 19.91984°, is attained when R is determined at an angle of $\theta'/4$ and H is correspondingly taken at $H'/4$. Thus R has been calculated from:

$$R = \frac{\text{SIN }\frac{\theta'}{4}}{\frac{H'}{4}}$$

This is due to the slight deviation of the sine function from an exactly linear function within the range of $\theta'$. The resulting accuracy of readings produced by the instrument of this invention is of the order of one-tenth of one percent. Thus the accuracy of same is substantially greater than that of similar devices found in commercial use.

Figures 26, 27:
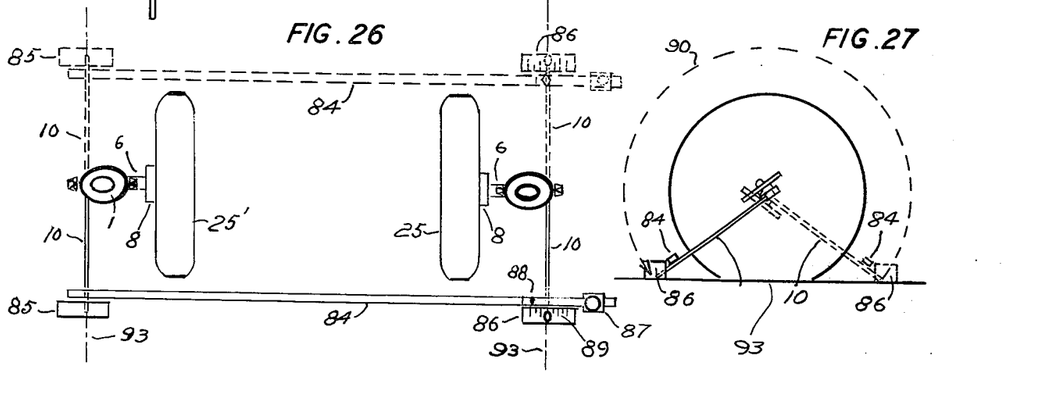
FIG. 26 is a plan view diagram illustrating a pair of vehicle wheels with instruments attached thereto, and means of measuring the wheel toe.
FIG. 27 is an erect side elevation of FIG. 26 illustrating the method of establishing an imaginary line accurately parallel to a wheel.

Referring now to FIG. 26 which is related to the diagram of FIG. 6 the means and method of determining the "toe" measurement will be explained. A pair of instruments as previously described are shown mounted on the hubs of wheels 25 and 25' where the latter is assumed to be the right hand wheel. One end of toe rod 10 is inserted in the corresponding hole in instrument support base 14 and is secured therein by tightening thumb screw 15. Each instrument is then rotated on its respective hub toward the rear until the outer end of rods 10 touch the floor or other similar plane surface such as an alignment rack extension. Blocks 85 and 86 which are relatively heavy for their size are carefully placed at the ends of rods 10 so that the latter protrude within slots 95. Block 86 contains graduated toe scale 89 and is preferably used on the left side of the vehicle. Measuring rod 84 which is rigid and light and which contains notch 94 is then carefully passed under the vehicle so that its end is allowed to rest on the opposite rod 10 and then slide by gravity into contact with block 85. Rod 84 is then carefully drawn over rod 10 until notch 94 registers therewith, thus holding one end of rod 84 in position. The operator's end of measuring rod 84 is then rested on toe rod 10 on the left side of the vehicle, and is allowed to slide into contact with block 86. An adjustable pointer 88 is placed opposite zero on the toe scale and locked in this position by tightening thumb screw 76, as illustrated in FIG. 31, in which 87 is slidable on rod 84.

The next step in this method of measuring toe consists of rotating the instruments on their respective hub mountings thru an arc depicted by 90 in FIG. 27 until the tip of each toe rod 10 again touches the floor in a forward position. Thus an imaginary line 93 is established parallel to each wheel plane. Blocks 85 and 86 are then placed in the forward position as indicated by their solid outlines in FIGS. 26 and 27. Measuring rod 84 is then carefully placed on rods 10 again. Pointer 88 then accurately indicates the amount of toe, in or out, or zero. It should be understood that in this method of toe measurement rods 10 need not be straight or square with the wheel axis. The arcuate principle described eliminates such constructional limitations, since the tip only of rod 10 is used to establish the two points on the floor which determine the imaginary parellel line 93 for each wheel.

Figures 28, 29, 30, 31, 32:
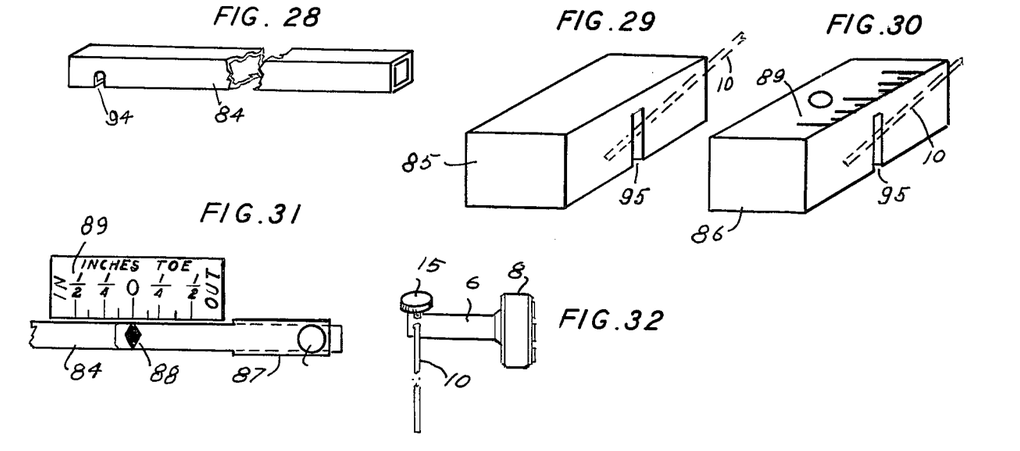
FIG. 28 is a shortened illustration of a measuring rod for measuring "toe."
FIG. 29 is a view of a relatively heavy metal block for marking and holding the end points establishing an imaginary line.
FIG. 30 is identical to FIG. 29 but containing a graduated scale for measuring "toe."
FIG. 31 illustrates the combined use of the measuring rod of FIG. 28 and toe blocks of FIGS. 29 and 30 for measuring toe-in or toe-out.
FIG. 32 illustrates a substitute, magnet-containing body which supports a detachable toe rod, and which may be used as a substitute for one of a pair of instruments in the operation of measuring "toe."

Since all the alignment measurements of camber, caster, and steering axis may be made with one instrument, the use of a holding body 6 for toe rod 10 with magnet housing 8 and thumb screw 15 as illustrated in FIG. 32 may be substituted for one instrument in a minimum alignment set of equipment.

Figure 24:
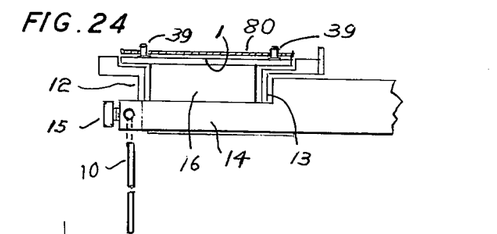
FIG. 24 is a partial elevation of FIG. 22 illustrating a detachable "toe" rod and a detachable, auxiliary dial.
Figure 25:
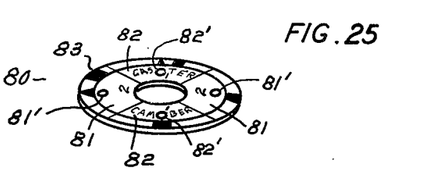
FIG. 25 illustrates a detachable, specialized dial plate.

An additional feature of the invention comprising an improvement in the art is illustrated in FIGS. 24 and 25 in which the instrument dial temporarily supports a specification plate 80 on two posts 39 protruding upward from dial 1. Specification plate 80 is circular and contains indices of camber and caster limits for various groups of vehicles on both sides. One side of plate 80 as illustrated in FIG. 25 may contain two pairs of quadrants. Each pair provides the specification limits of a group of vehicles by means of solid segments 83. Each pair of quadrants is numbered, as 1 or 2 in FIG. 25. The opposide side of the plate contains two additional quadrant pairs such as 3 and 4. Similar, non circular plates currently in commercial use require eight in number using two sides of each plate to emcompass all current United States passenger vehicles. Thus 16 plate surfaces are required in a set of such plates. However, with the circular plate described for use on the circular dial of the instrument disclosed herein the quantity of plates is reduced to four, or a 50 % reduction. This improvement is accomplished by providing for two positions of plate 80 on pins 39 by using either holes 81' or holes 82' to locate quadrants 81 or 82 in the proper positions on top of the instrument dial 1. Thus each plate contains four sets of specifications and only four plates are then required to provide for sixteen specification groups.

To those familiar with the art it will be evident that the important measurements of wheel alignment may be made with the device described thru a minimum of expenditure for equipment while obtaining a maximum of accuracy.

Instrument body 14 contains an instruction plate 97 held on the lower side of same preferably by small screws 99. The procedures generally stated by the instructions for use of the instrument are well known in the automotive industry and are briefly summarized as they apply to the described invention.

Camber is measured by placing the instrument on the wheel hub or any adapter parallel thereto so that the level vial is perpendicular to the wheel. The dial of the instrument is then rotated to center the bubble. The camber angle is then read opposite pointer 4.

Caster is measured by similarly mounting the instrument with the vial perpendicular to the wheel after which the wheel is swung thru and angle of 20°. This angle is measured by a protractor type scale preferably on conventional turning radius plates, not shown, on which the wheels rest. At the 20° angle the instrument vial is leveled by turning the dial, after which pointer 5 is set on zero of the caster scale. The wheel is then swung back to a straight ahead point and on thru 20° for a total of 40°. The dial is then turned again to level the bubble after which the caster angle is read opposite pointer 5. The direction of swing of the wheel determines whether the caster reading is positive or negative, and this information is conveniently noted on the dial.

Steering axis inclination (or king pin angle) is measured by mounting the instrument on the wheel or spindle (using an adapter not shown) with the level vial parallel to the wheel. The entire dial, with pointers 4 and 5 are turned as a unit thru 90° to so locate the vial. Camber arm 12 is used as the operating lever in this instance. The lever may be turned in either direction. The 90° position is automatically selected by the detents 72 in which bullet latch 41 snaps. The vehicle brakes must be securely locked to prevent the wheel from rotating, unless the instrument is mounted on the wheel spindle as referred to. The "inclination" of the steering axis is then measured by swinging the wheel 20°, centering the vial bubble by turning the instrument on its mounting surface during which the camber pointer should be on zero, setting the caster pointer on zero, and then swinging the wheel thru 40° in the opposite direction. The dial is then turned again to level the bubble after which the steering axis inclination is read on the caster scale. There is no positive or negative value since the measured angle is always inward from vertical.

Caster correction is made by placing the instrument with the vial parallel with the wheel and with the camber arm toward the rear of the vehicle. The camber dial is then set on zero after which the vial bubble is centered by turning the entire instrument on its magnet mounting. The vehicle brakes must be locked unless a spindle mounted adapter is used for the mounting, as previously stated in the procedure of measurement of steering axis inclination. The amount of caster correction desired is then set opposite pointer 4 on the camber dial by turning the latter. The correction may be either positive or negative. Caster is then corrected by adding or removing shims or by adjustment of an eccentric etc. in the wheel suspension system as the case may be. Caster is then rechecked by the methods of measurement previously described.

Camber correction is performed by placing the instrument with its vial perpendicular to the wheel as when measuring camber. The desired camber reading is set opposite the camber pointer 4. The wheel suspension system is then adjusted until the vial bubble is centered. This obviously results in a corrected reading of camber.

Toe is corrected by noting the amount by which the measured toe on scale 89 differs from manufacturer's specifications. The steering tie rods are then adjusted to correct any difference.

Modifications and substitution of elements without departing from the basic design and method are considered as included in the following claims.

I claim:

1. A vehicle wheel alignment instrument comprising a circular dial operationally oriented in a substantially horizontal plane, camber and caster graduations contained on the face and an opening in the center of said dial, a level vial operably and visably located in said opening, said dial being rotatable about an axis central and normal to its face, means communicating between said dial and said vial to produce tilting of the latter in proportion to the angle of turn of said dial, two pointers supported adjacent the periphery of said dial, one of said pointers being movable relative to the other pointer, said dial being independently rotatable relative to said pointers; said dial, pointers, and vial being additionally rotatable as a unit without relative rotation between them; a mounting body supporting said dial, pointers, and vial, said body being elongated and terminating at one end in a housing containing a circular magnet, the pole faces of said magnet being oriented in a plane vertical to the plane containing said dial, the other end of said body containing a detachable rod held rigid with said body and extending unilaterally therefrom at approximate right angles to the long axis thereof, said rod extending a distance greater than the height of said instrument from the horizontal plane on which an associated vehicle rests, said instrument being rotatable at its mounting on a wheel of said vehicle for the purpose of describing an imaginary arc in an approximate vertical plane and at the outer end of said rod, said imaginary arc terminating at two points on a plane substantially horizontal and parallel with the resting plane of said vehicle, said two points determining a line parallel with said wheel and perpendicular to a vertical plane containing the spindle axis of said wheel, said imaginary line together with a second similar line established by the same means relative to a second wheel on the opposite side vehicle providing the basis for measurement between said lines to determine the parallelism of one wheel with the other in a horizontal plane; a graduated scale held adjacent to the arcuate end of one of said rods and measuring indicating means cooperating with said scale for determining the toe measurement of said pair of wheels.

2. The instrument described in claim 1, comprising an assembly which includes a cam and follower, said follower being spring biased against said cam, and a level vial mounted rigidly with said follower.

3. The instrument described in claim 1, including a circular, rotatable body, a circular cam rigidly and a adjustably attached to said body, a level vial and a pivoted tiltable support therefor, a follower extending from said support and contacting said cam, a spring maintaining resilient pressure between said cam and said follower, said cam and circular body being rotatable relative to said follower in a plane at right angles to the plane of tilt of said vial, and a calibrated dial mounted for operation in a substantially horizontal position on said rotatable body.

4. The instrument as described in claim 1, in which a dial contains graduations for camber and caster degrees calculated to be arranged in a single circle so as to occupy exactly 360° of arc of said circle when an exact, whole number of camber and caster degrees, added together, are applied thereto by means of spaced, radial graduation lines.

5. The instrument as described in claim 1, in which a central circular support member formed to provide multiple bearing journals of different diameters thereon supports a rotatable dial mount and a caster pointer arm; a rectangular shoulder symmetrical with said journals, said support terminating at its lower end in one of said journals the latter fitting a hole in a wide flanged bushing, said bushing being rotatable in a support base, rotation being produced by manual operation of a camber pointer arm fitting said rectangular shoulder.

6. The instrument as described in claim 1, in which said elongated body terminating at one end in a housing and containing a circular magnet is separable from said rigid mounting body while being operably attached thereto by adequate fastening means.

7. The instrument described in claim 1, including an auxiliary mounting body containing said magnet and removable rod together with measuring and indicating means for measuring toe-in or toe-out of a pair of vehicle wheels.

8. The instrument as described in claim 1, including means associated with the face of said dial for locating and holding a removable auxiliary dial plate.

9. The instrument described in claim 8 including a plurality of circular auxiliary dial plates.

10. The instrument described in claim 9 in which said auxiliary dial plates are provided with means for more than one position on said dial.

11. The instrument described in claim 1, in which a circular, horizontal dial containing graduations for camber and caster angles are arranged around the periphery thereof, said camber graduations being extended into the caster zone and vice versa.

* * * * *